United States Patent [19]

Begley et al.

[11] 4,095,121
[45] June 13, 1978

[54] RESONANTLY ENHANCED FOUR-WAVE MIXING

[75] Inventors: Richard F. Begley, Los Alamos; Norman A. Kurnit, Santa Fe, both of N. Mex.

[73] Assignee: The United States of America as represented by the United States Department of Energy, Washington, D.C.

[21] Appl. No.: 787,415

[22] Filed: Apr. 14, 1977

[51] Int. Cl.$^2$ .............................................. H03F 7/04
[52] U.S. Cl. ................................................. 307/88.3
[58] Field of Search ...................................... 307/88.3

[56] References Cited

U.S. PATENT DOCUMENTS

| | | | |
|---|---|---|---|
| 3,795,819 | 3/1974 | Harris | 307/88.3 |
| 3,881,115 | 4/1975 | Hodgson et al. | 307/88.3 |
| 3,892,979 | 7/1975 | Hodgson et al. | 307/88.3 |
| 3,914,618 | 10/1975 | Harris | 307/88.3 |
| 4,006,363 | 2/1977 | Schlossberg | 307/88.3 |

OTHER PUBLICATIONS

Minck et al., "Applied Physics Letters", 15 Nov. 1963, pp. 181–184.
Armstrong et al., "Physical Review," Sep. 15, 1962, pp. 1918–1922.
Maker et al., "Physical Review," 1 Feb. 1965, pp. A801-A809.
Garmire et al., "Physical Review Letters," 15 Aug. 1963, pp. 160–163.
Bloembergen et al., "Physical Review Letters," 4 May 1964, pp. 504–507.
"Optics Communications," Jul. 1976, pp. 204–205.
Sorokin et al., "Applied Physics Letters," 1 Apr. 1973, p. 342.
Kildal et al., "J. Quantum Electronics," Jul. 1976, p. 429.

Primary Examiner—Rudolph V. Rolinec
Assistant Examiner—Darwin R. Hostetter
Attorney, Agent, or Firm—Dean E. Carlson; William W. Cochran, II

[57] ABSTRACT

A method and apparatus for achieving large susceptibilities and long interaction lengths in the generation of new wavelengths in the infrared spectral region. A process of resonantly enhanced four-wave mixing is employed, utilizing existing laser sources, such as the $CO_2$ laser, to irradiate a gaseous media. The gaseous media, comprising $NH_3$, $CH_3F$, $D_2$, HCl, HF, CO, and $H_2$ or some combination thereof, are of particular interest since they are capable of providing high repetition rate operation at high flux densities where crystal damage problems become a limitation.

21 Claims, 3 Drawing Figures

RESONANTLY ENHANCED FOUR-WAVE MIXING

BACKGROUND OF THE INVENTION

The present invention pertains generally to lasers and more particularly to generation of tunable infrared radiation.

There has been a long standing need for an efficient high-power source of tunable infrared radiation for the purpose of laser isotope separation and various photochemical applications. A variety of nonlinear optical frequency conversion techniques using crystals have been developed which provide tunable infrared radiation. These devices, however, have not been scalable in size or pulse repetition rate as required by many potential applications. Although the process of four-wave mixing in molecular gases has been successfully used for generation of ultra-violet wavelengths by utilizing the large electronic contribution to the third order susceptibility available in the ultra-violet spectral region, this process has not been successfully utilized in the infrared region to produce a source of tunable high power infrared radiation.

SUMMARY OF THE INVENTION

The present invention overcomes the disadvantages and limitations of the prior art by providing a method and device for utilizing resonantly enhanced four-wave mixing to produce tunable infrared radiation. The present invention incorporates standard input power sources such as the $CO_2$ laser to irradiate a molecular gas or mixture of gases such as $NH_3$, $CH_3F$, $D_2$, HCl, HF, CO, and $H_2$. The input excitation source provides fields having a difference frequency which is substantially equal to a Raman frequency of the molecular gas. A third excitation frequency which may or may not equal one of the other excitation frequencies is used to produce a polarization in the molecular gas which generates a coherent anti-Stokes signal and a coherent Stokes signal. One or more of the incident radiation fields may be near resonant with an infrared transition of the molecule to provide a further resonant enhancement of the susceptibility. The interaction may be made to occur in a waveguide to increase focal interaction length and enhance phase matching.

It is therefore an object of the present invention to provide a method and apparatus for resonantly enhanced four-wave mixing to produce tunable infrared radiation.

It is also an object of the present invention to provide a method and apparatus for resonantly enhanced four-wave mixing in molecular gases to produce tunable infrared radiation which is scalable in size and repetition rate.

Another object of the present invention is to provide a method and device for resonantly enhanced four-wave mixing in molecular gases which is efficient in operation.

Other objects, advantages and novel features of the invention will become apparent from the following detailed description of the invention when considered in conjunction with the accompanying drawings wherein:

DETAILED DESCRIPTION OF THE PREFERRED EMBODIMENT OF THE INVENTION

Figure 1:
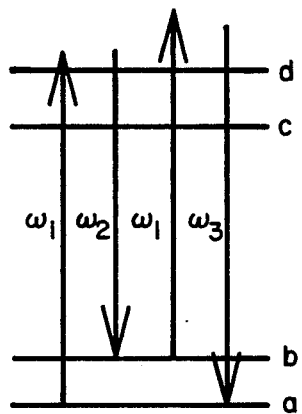
FIG. 1 is an energy level diagram for coherent anti-Stokes generation of $\omega_3$.
Figure 2:
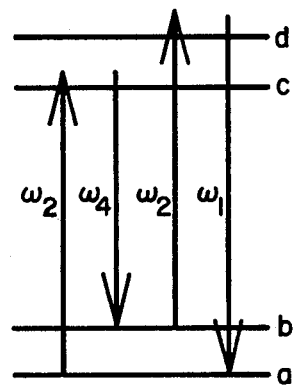
FIG. 2 is an energy level diagram of coherent Stokes generation of $\omega_4$.

FIG. 1 illustrates upshifted coherent anti-Stokes generation of $\omega_3$ where $\omega_3 = 2\omega_1 - \omega_2$, whereas, FIG. 2 schematically illustrates down-shifted coherent Stokes generation of $\omega_4$ where $\omega_4 = 2\omega_2 - \omega_1$. In both cases, enhancement of the third order susceptibility is obtained by choosing $\omega_1 - \omega_2$ to be resonant with a Raman allowed rotational transition of the molecular gas while both $\omega_1$ and $\omega_2$ are each near resonant with one or more infrared transitions of the molecule, e.g., $NH_3$.

The generation of down-shifted coherent Stokes radiation, $\omega_4$, as shown in FIG. 2 provides relatively large susceptibility in $NH_3$, i.e., on the order of $5 \times 10^{-13}$ esu. The susceptibility is given by the equation:

$$\chi^{(3)}(2\omega_2 - \omega_1) \approx \frac{n_{ab}\mu_{ad}\mu_{db}\mu_{ba}\mu_{ca}}{h^3(\omega_2 - \Omega_{ca})(\omega_1 - \Omega_{da})(\Delta + i\Gamma)} \quad (1)$$

where: $\Delta = \omega_1 - \omega_2 - \Omega_{ba} << \Gamma$, the Raman linewidth. This large susceptibility in $NH_3$ results from the fact that $\omega_1$, $\omega_2$ and $\omega_4$ all lie within 2.3 cm$^{-1}$ of infrared transitions which couple the two rotational states $a = s(3, 3)$ and $b = s(4,3)$, as a result of choosing one of the input frequencies ($\omega_2$) to lie near a Q branch and the other input frequency ($\omega_1$) to lie in the R branch of $NH_3$. Such large resonant enhancements of the susceptibility can in general be obtained when one of the input frequencies lies near a molecular Q branch and the other lies in a P or R branch. This includes the case of coherent anti-Stokes generation, e.g. with $\omega_4$ in FIG. 2 an input frequency in the P branch and $\omega_1$ the generated frequency.

Figure 3:
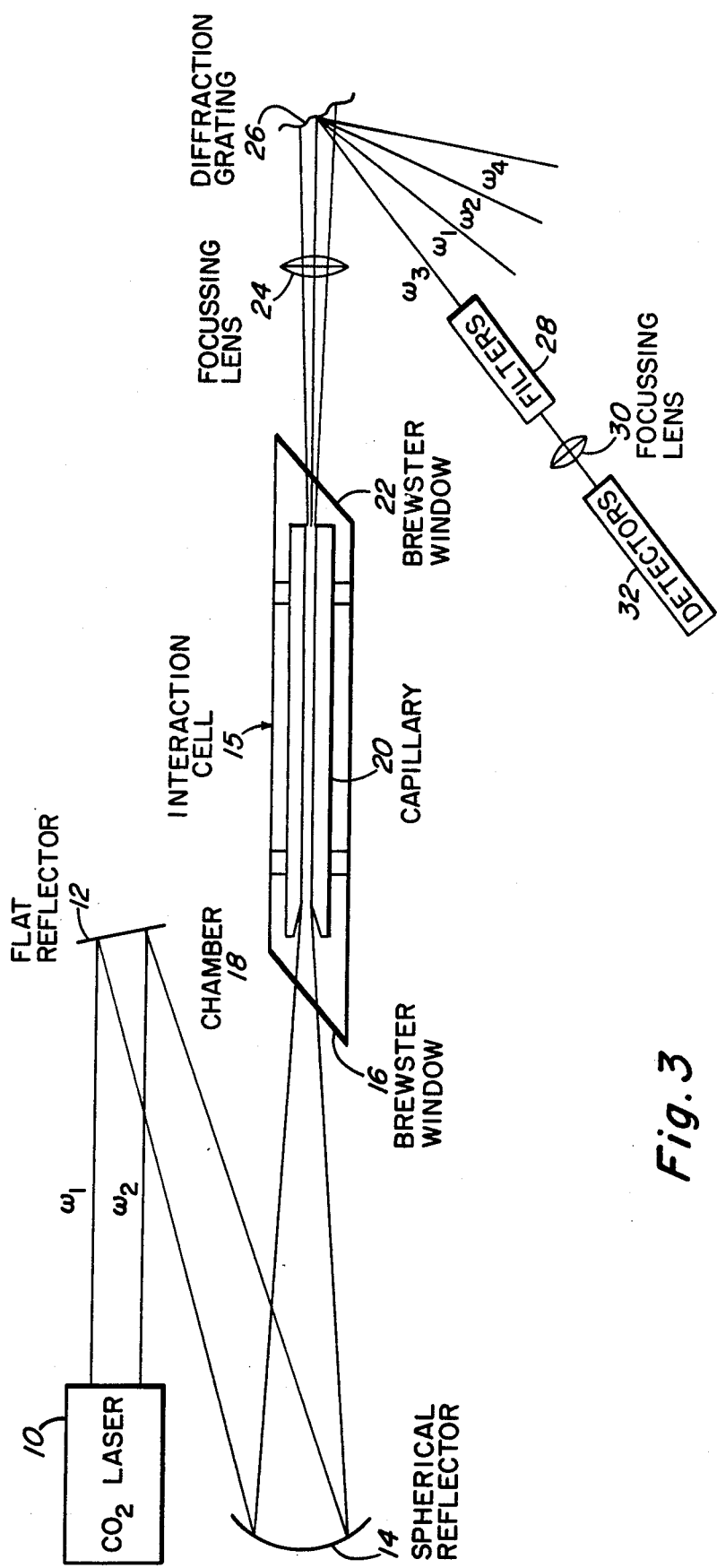
FIG. 3 is a schematic diagram of the device of the preferred embodiment of the invention.

The device of the preferred embodiment of the invention is schematically shown in FIG. 3. Two coherent beams $\omega_1$ and $\omega_2$ are emitted by the $CO_2$ laser 10 from neighboring regions in the same laser discharge. $CO_2$ laser 10 utilizes a single non-Littrow grating and two return mirrors (not shown) for wavelength selection. The laser pulse produced by $CO_2$ laser 10 is typically a gain switched spike of approximately 100 ns width, followed by a longer tail of comparable energy with a small degree of spontaneous mode-locking. Each of the two beams at frequency $\omega_1$ and $\omega_2$ have an energy of up to a few hundred millijoules. The beams are reflected through flat reflector 12 and spherical reflector 14 to an interaction cell 15. Interaction cell 15 comprises Brewster window 16 through which the laser beams are transmitted into a chamber 18. Mounted within the chamber 18 is a capillary 20. The two laser beams are focused through the capillary 20 which typically might have a length of approximately one meter and a diameter of approximately one to two mm. The capillary 20 provides a long interaction length at high field strength with the molecular gas which is inserted within the chamber 18. By proper focusing, a large fraction, i.e., up to 80% to 90%, of the incident energy emerges from the waveguide via the Brewster window 22 in a clean low-order mode. The input end of the capillary 20 is tapered to avoid ablation of wall material, thereby preventing the introduction of impurities which might initiate plasma breakdown.

The emerging beams are recollimated by focusing lens 24 and dispersed by diffraction grating 26 to spatially separate the frequencies as shown. The diffraction grating 26 can be rotated to align any desired line with filter 28 which functions to remove scattered $CO_2$ radiation. Focusing lens 30 directs the filtered radiation to an Au:Ge detector 32 for detection. A circular variable interference filter is used for detecting both $\omega_3$ and $\omega_4$ while an additional gas cell filled with 1,3 butadiene is used for detecting the less intense $\omega_3$.

In experimental tests the P(18) 9.54 μm wavelength line from a TEA $CO_2$ laser was selected as $\omega_1$ which is near resonant with the $\nu_2$ [sR(3,3)] transition of $NH_3$, while the R(10) 10.32 μm line has been selected as $\omega_2$ which is near resonant with $\nu_2$ [sQ(3,3)] and $\nu_2$ [sQ(4,3)] of $NH_3$. The large dispersion produced by the Q branch of $NH_3$ is evidenced by peaking of the intensity of the generated wave at relatively low pressure, e.g., on the order of several torr. Enhanced phase matching has been achieved by the addition of the molecular gas $CH_3F$ to the $NH_3$ in the chamber 18, as well as by propagating the $\omega_1$ beam in a higher order waveguide mode. By optimizing phase matching in the waveguide in this manner, efficiency is increased.

Although the highly resonant case described above has a relatively large susceptibility, there are advantages to the use of diatomic molecules such as $D_2$, HCl, HF, CO, and $H_2$ with no near-resonant intermediate state. In this case, the larger fraction of molecules in a given rotational state, smaller Raman linewidths, (Γ) longer coherence lengths, and higher breakdown thresholds and saturation intensities offsets the loss in susceptibility due to the lack of an intermediate state resonance. Calculations based on experimental data give a susceptibility of $\sim 7 \times 10^{-14}$ esu at 77° K. A product of Raman gain and effective interaction length, gL, of $\sim 0.3$ is achievable at reasonable pump powers in a focused beam, giving a calculated conversion efficiency $I_3/I_2 = (gL/2)^2 \approx 2\%$. With the successful use of capillary waveguides to increase the interaction length, a Raman gain of 1.5/meter over interaction lengths of a meter or more is achievable. For a 1 meter waveguide this is 5 times greater than that achievable without the waveguide.

The present invention therefore provides a method and device for generating infrared radiation by four-wave mixing in molecular gases using coherent beams of monochromatic radiation from conventional sources to irradiate a gaseous media. The process of the present invention provides a system which can withstand high fluxes and high repetition rates and which has large susceptibilities, thereby increasing the overall efficiency of the process.

Obviously many modifications and variations of the present invention are possible in light of the above teachings. For example, various materials can be used for the capillary 20 including quartz, pyrex, BeO, MgO, $Al_2O_3$ or other suitable materials. In addition, two or three separate, synchronized lasers could, as well, be used to provide the two or three input frequencies required by the present invention. It is therefore to be understood that the present invention may be practiced otherwise than as specifically described.

What we claim is:

1. A method for generating tunable infrared radiation by four-wave mixing in a molecular gas comprising the steps of:
   generating a first coherent, variable excitation signal $\omega_1$ which is near resonant with at least one infrared transition of said molecular gas;
   generating second coherent, variable excitation signal $\omega_2$ which is near resonant with at least one infrared transition of said molecular gas;
   irradiating said molecular gas with said first and second coherent, variable excitation signals in a waveguide to increase focal interaction length and enhance phase matching to increase efficiency;
   whereby $\omega_1 - \omega_2$ is resonant with a Raman allowed rotational transition thereby enhancing third order susceptibility and intensity.

2. The method of claim 1 wherein said molecular gas comprises $NH_3$.

3. The method of claim 1 wherein said molecular gas comprises a mixture of $NH_3$ and a gas to further enhance phase matching.

4. The method of claim 3 wherein said gas comprises $CH_3F$.

5. The method of claim 1 wherein said step of irradiating said molecular gas comprises:
   directing said first and second coherent, variable excitation signals in colinear beams;
   aligning said waveguide with said colinear beams.

6. A device for generating a tunable infrared signal by four-wave mixing in a molecular gas comprising:
   means for generating a first excitation signal having a frequency $\omega_1$ and a second excitation signal having a frequency $\omega_2$;
   a chamber containing said molecular gas;
   a capillary waveguide disposed within said chamber;
   means for directing said first and second excitation signals through said capillary waveguide to irradiate said molecular gas and generate a tunable infrared signal by varying $\omega_1$ and $\omega_2$;
   whereby both $\omega_1$ and $\omega_2$ are near resonant with at least one infrared transition in said molecular gas and $\omega_1 - \omega_2$ is resonant with a Raman allowed rotational transition.

7. The device of claim 6 wherein said chamber comprises a vacuum chamber having Brewster windows at each end.

8. The device of claim 6 wherein said capillary waveguide is tapered at one end to prevent ablation.

9. The device of claim 6 further comprising:
   a diffraction grating aligned with said capillary waveguide to spatially disperse the various signals emitted from said waveguide; and
   means for detecting said various signals.

10. The device of claim 9 wherein said capillary waveguide is tapered at one end to prevent ablation.

11. The device of claim 6 wherein said molecular gas comprises $NH_3$.

12. The device of claim 6 wherein said molecular gas comprises $NH_3$ plus a gas suitable for phase matching.

13. A device for generating a tunable infrared signal by four-wave mixing in a molecular gas comprising:
   means for generating a first excitation signal having a frequency $\omega_1$ and a second excitation signal having a frequency $\omega_2$;
   chamber means for retaining said molecular gas and emitting said tunable infrared signal produced by four-wave mixing in said molecular gas in response to irradiation of said molecular gas by said first and second excitation signals in said chamber means;

a capillary waveguide disposed within said chamber;

means for directing said first and second excitation signals through said capillary waveguide to increase focal interaction length and phase matching thereby enhancing efficiency;

whereby $\omega_1$ and $\omega_2$ are varied to vary the frequency of said tunable infrared signal and are near resonant with at least one infrared transition of said molecular gas and $\omega_1 - \omega_2$ is resonant with a Raman allowed rotational transition.

14. The device of claim 13 further comprising:

a diffraction grating aligned with said capillary waveguide to spatially disperse various signals emitted from said waveguide; and means for detecting said various signals.

15. A method for generating tunable infrared radiation by four-wave mixing in a molecular gas comprising the steps of:

generating a first coherent, variable excitation signal $\omega_1$ which is near resonant with at least one infrared transition of said molecular gas;

generating a second coherent, variable excitation signal $\omega_2$ which is near resonant with at least one infrared transition of said molecular gas;

irradiating said molecular gas with said first and second coherent, variable excitation signals in a waveguide to increase focal interaction length and enhance phase matching to increase efficiency;

whereby $\omega_1 - \omega_2$ is resonant with a Raman allowed rotational transition thereby enhancing third order susceptibility and output intensity.

16. The method of claim 15 wherein said molecular gas comprises $D_2$.

17. The method of claim 15 wherein said molecular gas comprises HCl.

18. The method of claim 15 wherein said molecular gas comprises HF.

19. The method of claim 15 wherein said molecular gas comprises CO.

20. The method of claim 15 wherein said molecular gas comprises $H_2$.

21. The method of claim 1 wherein said step of irradiating said molecular gas comprises:

directing said first and second coherent, variable excitation signals in colinear beams;

aligning said waveguide with said colinear beams.

* * * * *